United States Patent
Wilms et al.

(10) Patent No.: US 9,791,064 B2
(45) Date of Patent: Oct. 17, 2017

(54) QUANTITY CONTROL VALVE AND HIGH-PRESSURE PUMP WITH QUANTITY CONTROL VALVE

(71) Applicant: Robert Bosch GmbH, Stuttgart (DE)

(72) Inventors: Rainer Wilms, Markgroeningen (DE); Matthias Maess, Boeblingen (DE); Dominik Brunner, Wiernsheim (DE)

(73) Assignee: Robert Bosch GmbH, Stuttgart (DE)

( * ) Notice: Subject to any disclaimer, the term of this patent is extended or adjusted under 35 U.S.C. 154(b) by 180 days.

(21) Appl. No.: 14/367,294

(22) PCT Filed: Nov. 15, 2012

(86) PCT No.: PCT/EP2012/072673
§ 371 (c)(1),
(2) Date: Jun. 20, 2014

(87) PCT Pub. No.: WO2013/092019
PCT Pub. Date: Jun. 27, 2013

(65) Prior Publication Data
US 2015/0047726 A1  Feb. 19, 2015

(30) Foreign Application Priority Data
Dec. 20, 2011  (DE) .................. 10 2011 089 288

(51) Int. Cl.
*F16K 31/06* (2006.01)
*F02M 59/36* (2006.01)

(52) U.S. Cl.
CPC ....... *F16K 31/0689* (2013.01); *F02M 59/367* (2013.01); *F02M 2200/28* (2013.01); *F02M 2200/304* (2013.01); *Y10T 137/85986* (2015.04)

(58) Field of Classification Search
CPC .............. F16K 31/0689; F02M 59/367; F02M 2200/28; F02M 2200/304; Y10T 137/85986
USPC .................. 251/129.19, 48, 359; 137/565.11
See application file for complete search history.

(56) References Cited

U.S. PATENT DOCUMENTS

2004/0052664 A1 * 3/2004 Saito .................... F02M 59/366
417/490
2010/0043759 A1  2/2010 Kylström et al.

FOREIGN PATENT DOCUMENTS

| CN | 101432518 A | 5/2009 |
| DE | 198 34 120 A1 | 2/2000 |
| DE | 10 2009 046 079 A1 | 5/2011 |
| DE | 10 2009 046 082 A1 | 5/2011 |

(Continued)

OTHER PUBLICATIONS

International Search Report corresponding to PCT Application No. PCT/EP2012/072673, mailed Jan. 28, 2013 (German and English language document) (5 pages).

*Primary Examiner* — Jessica Cahill
*Assistant Examiner* — Daphne M Barry
(74) *Attorney, Agent, or Firm* — Maginot, Moore & Beck LLP (57) ABSTRACT

A quantity control valve comprises a valve needle configured to move in an axial direction, a damping chamber having a wall, and a valve element delimiting the damping chamber. The valve needle is configured to move the valve element in an opening direction. A gap is defined between the wall of the damping chamber and the valve element. The gap has at least one recess and connects the damping chamber to a flow duct.

13 Claims, 6 Drawing Sheets

(56) References Cited

FOREIGN PATENT DOCUMENTS

| | | |
|---|---|---|
| EP | 1 348 864 A1 | 10/2003 |
| JP | 10-176762 A | 6/1998 |
| JP | 11-182706 A | 7/1999 |
| JP | 2000-161522 A | 6/2000 |
| JP | 2002-521616 A | 7/2002 |
| JP | 2006-183470 A | 7/2006 |
| JP | 2007-40423 A | 2/2007 |
| JP | 2010-156266 A | 7/2010 |
| JP | 2010-168901 A | 8/2010 |
| JP | 2012-159180 A | 8/2012 |
| KR | 1019960011219 | 4/1996 |
| KR | 1019990082147 | 11/1999 |
| WO | 02/055870 A1 | 7/2002 |
| WO | 2011/067026 A1 | 6/2011 |
| WO | 2011/079989 A1 | 7/2011 |

\* cited by examiner

QUANTITY CONTROL VALVE AND HIGH-PRESSURE PUMP WITH QUANTITY CONTROL VALVE

This application is a 35 U.S.C. §371 National Stage Application of PCT/EP2012/072673, filed on Nov. 15, 2012, which claims the benefit of priority to Serial No. DE 10 2011 089 288.5, filed on Dec. 20, 2011 in Germany, the disclosures of which are incorporated herein by reference in their entirety.

The disclosure relates to a quantity control valve and to a high-pressure pump having a quantity control valve.

BACKGROUND

Quantity control valves, in particular for metering a fluid, for a high-pressure pump arranged downstream are known. For example, they are used as quantity control valves in common rail fuel systems on motor vehicles in order to control the fuel flow delivered by a high-pressure feed pump to the common rail. Such quantity control valves can be actuated electromagnetically. They comprise a needle/armature assembly. An electromagnet, which is part of the needle/armature assembly, and a spring act on a valve element of the quantity control valve. Particularly at low speeds, the impact of a needle/armature assembly in the open and closed end positions of the quantity control valve leads to excitation of vibration, which has noticeable disadvantageous audible and mechanical effects.

DE 10 2009 046 079 A1 has disclosed a quantity control valve which has a damping device that comprises a fluid container bounded by a moving piston. The piston is arranged in such a way that it is acted upon by the valve element shortly before impingement upon the stop and thus pushes fluid out of the fluid container through a restriction.

In WO 2011 067026 A1, a description is given of a quantity control valve which has a hydraulically acting shield that keeps any backflow at least partially away from a valve element. The shield is a pot-shaped component that is securely connected to a valve housing. The shield is arranged in such a way in relation to the valve element that an axial end face of the valve element is covered by the pot-shaped component.

SUMMARY

The problem underlying the disclosure is solved by a quantity control valve. Advantageous developments are indicated in the claims. Features important for the disclosure can furthermore be found in the following description and in the drawings, wherein the features may be important for the disclosure both in isolation and in various combinations, even if there is no further explicit reference to this fact.

It is a basic concept of the disclosure that a damping device for a quantity control valve can be created by using the valve element as an immersed body in combination with a pot-type damping chamber, said damping device having at least one hydraulic restriction. These restrictions can be configured in such a way that the damping effect varies as a function of the position of the valve element relative to the damping chamber. It is thereby possible to adapt the speed profile of the valve element to various uses. It is particularly advantageous here that the disclosure is integrated directly into the quantity control valve without additional components. Thus, the disclosure does not give rise to any additional costs.

Moreover, the damping device according to the disclosure is insensitive to scatter in the component dimensions, which is unavoidable in any mass production process.

The quantity control valve according to the disclosure has the advantage that the excitation of noise is reduced and, furthermore, the robustness of the quantity control valve is increased by reducing a speed of impact of a valve element on a stop. The reduced speed at impact also reduces the risk that the valve element will rebound from the stop against the needle/armature assembly. Consequently, the reduced mechanical stress allows a reduction in the moving masses, that is to say the needle can be of lighter construction and hence the magnetic circuit can also be made weaker. The disclosure thus also leads to a reduction in the electric power loss by the electromagnetically actuated quantity control valve.

The damping device according to the disclosure for the quantity control valve operates fundamentally as follows: during an opening movement, the needle/armature assembly of an actuator strikes a plate-shaped valve element and raises the latter from a resting seat against a spring force. The valve element, for its part, acts on the fluid present in the damping chamber. In this case, the fluid is put under pressure and escapes from the damping chamber through a gap formed between the valve element and a wall of the damping chamber. Owing to the restriction effect of the gap, the fluid can escape from the fluid container only slowly, and the valve element is retarded in an effective manner. As a result, the speed of impact of the valve element on a stop is reduced and noise evolution decreases.

Because the narrow gap formed between the plate-shaped valve element and a wall of the damping chamber depends relatively heavily on the manufacturing tolerances of the valve element and of the wall, it is, according to the disclosure, provided with at least one but preferably a plurality of recesses (e.g. three) of defined size (cross section and depth). These recesses widen the gap in some areas. The gap is designed as a sliding fit between the plate-shaped valve element and the wall and is used primarily to guide the valve element.

The effective flow cross section formed, in particular, by the recess cross-sectional areas arranged perpendicularly to the direction of flow of the fluid is very much larger than the flow cross section of the gap. The unavoidable manufacturing tolerances of the damping chamber and the valve element therefore now affect only the guidance of the valve element but not the damping behavior of the quantity control valve. In the quantity control valve according to the invention disclosure, the effective flow cross section depends especially on the cross-sectional areas of the recesses. As a result, the desired restriction effect can be determined by means of the dimensions and shape of the recesses and not by the width of the gap between the wall and the valve element. Here, the manufacturing tolerances of the recesses have only a slight effect on the restriction effect, and therefore the scatter in the damping behavior of different instances of a mass-produced quantity control valve is low.

This effect can be achieved especially if the proportion of recesses on the periphery of the gap is less than 50%, preferably less than 30%.

A solution which is simple in terms of manufacturing technology envisages that the at least one recess should extend radially outward in the wall of the damping chamber or radially inward in the valve element, orthogonally to a longitudinal axis of the quantity control valve. The damping chamber can be produced as a formed sheet metal part or from plastic. In the latter case, it can be an integral part of a housing of the quantity control valve.

In order to be able to adapt the damping behavior of the valve element as well as possible to the conditions of use, provision is made to vary the free flow cross section of the gap as a function of the position of the valve element relative to the damping chamber.

An embodiment according to the disclosure envisages that a depth T of the recess is less than the depth of the gap. The depth of the gap is limited by a first projection, on which the valve element abuts in the open position thereof.

If the depth of the recesses is less than the abovementioned gap, the valve element covers the recess completely on its way toward the open position, and only the effective flow cross section formed by the gap is then opened to the escaping fluid. As a result, the restriction effect is intensified and the speed of the valve element is reduced further. As a result, opening of the quantity control valve takes place in two stages. In the first stage, a relatively large effective flow cross section is available, formed by the radial gap and the recess. The fluid can thus escape quickly and with little damping from the damping chamber, and the valve element moves quickly into the open position. The second stage is activated when one edge of the valve element projects beyond a second projection and hence the recess is completely covered. The effective flow cross section is then smaller than in the first stage. As a result, the fluid escapes more slowly from the damping chamber. As a result, the valve element is retarded even further and strikes against the first projection with a further reduced speed. It is thus advantageously possible to combine a short opening time of the quantity control valve with very little noise evolution.

Another embodiment according to the disclosure envisages that the recess tapers from one (front) edge toward a constriction. This ensures that the effective flow cross section decreases continuously in the direction of the stop, that is to say in the direction of the first projection. A continuously increasing restriction effect is thus achieved, the closer the valve element comes to its stop. This results in the same advantages as already explained above.

BRIEF DESCRIPTION OF THE DRAWINGS

Illustrative embodiments of the disclosure are explained below with reference to the drawing, in which.

DETAILED DESCRIPTION

The same reference signs are used for functionally equivalent elements and dimensions in all figures, even in the case of different embodiments.

Figure 1:
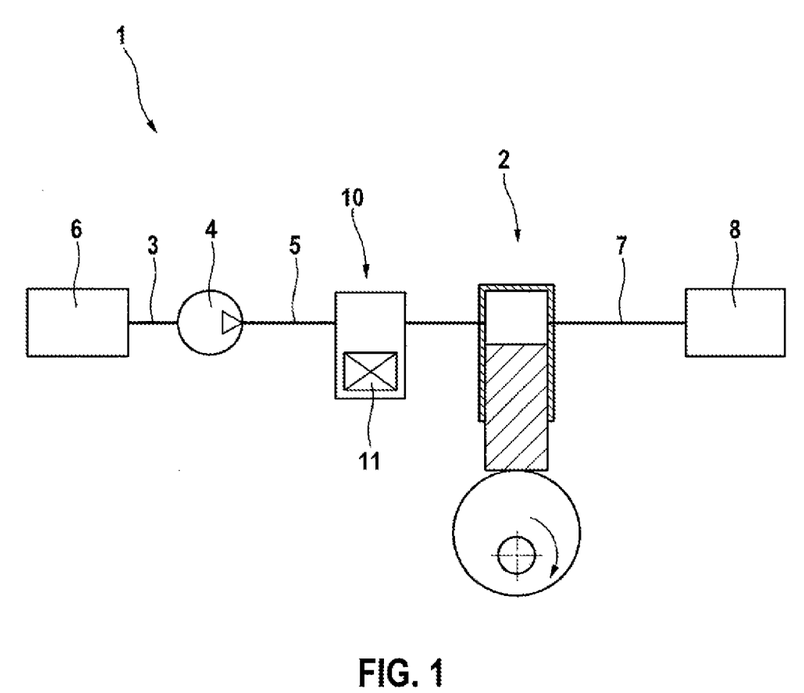
FIG. 1 shows an overall illustration of a fuel system having a high-pressure pump, a common rail system and a quantity control valve.

FIG. 1 shows a fuel system 1 of an internal combustion engine in a greatly simplified illustration. A high-pressure pump 2 (not explained specifically) designed as a piston pump is connected upstream, via a suction line 3, a priming pump 4 and a low-pressure line 5, to a fuel tank 6. A high-pressure accumulator 8 ("common rail") is connected downstream to the high-pressure pump 2 via a high-pressure line 7. A quantity control valve 10 having an electromagnetic actuating device—referred to below as actuator 11—is arranged hydraulically between the low-pressure line 5 and the high-pressure pump 2 and forms the inlet valve of the high-pressure pump 2. Other elements, such as the outlet valve of the high-pressure pump 2, are not shown in FIG. 1. It is self-evident that the quantity control valve 10 can be integrated into the high-pressure pump 2.

During the operation of the fuel system 1, the priming pump 4 pumps fuel from the fuel tank 6 into the low-pressure line 5.

The high-pressure pump 2 draws fuel from the low-pressure line 5 and pumps it into the high-pressure line 7 and the high-pressure accumulator 8.

Because the high-pressure pump 2 is a piston pump, it has a suction stroke and a delivery stroke. The delivery volume of the high-pressure pump 2 is controlled by the quantity control valve 10, e.g. by remaining open for a longer or shorter time during a delivery stroke of the high-pressure pump 2.

Figure 2:
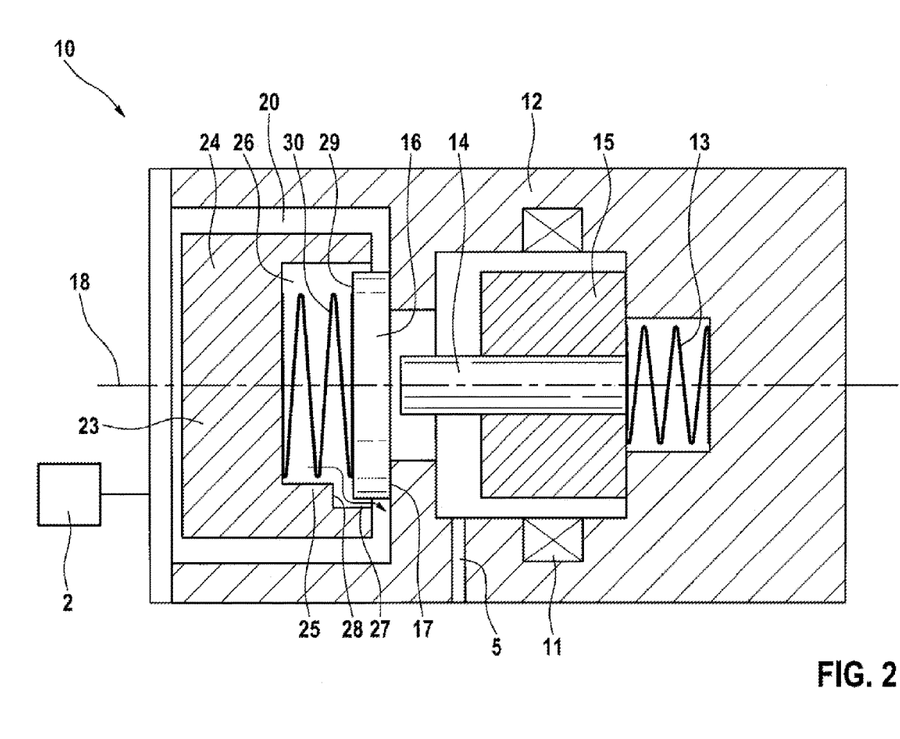
FIG. 2 shows a quantity control valve in a sectional illustration.

FIG. 2 shows a partial longitudinal section of the quantity control valve 10. The quantity control valve 10 comprises a housing 12, a valve needle 14 acted upon by a solenoid valve spring 13 and having a magnet armature 15 arranged thereon, a plate-shaped valve element 16 and a valve seat 17 ("resting seat") fixed relative to the housing and interacting with said element. The elements of the quantity control valve 10 are substantially rotationally symmetrical with respect to a center line 18. The valve needle 14 and the magnet armature 15 form a needle/armature unit.

In FIG. 1, the high-pressure pump 2 is arranged to the right of the quantity control valve 10, and the low-pressure line 5 coming from the priming pump 4 is arranged to the left of the quantity control valve 10.

During a suction stroke of the high-pressure pump 2, the valve element 16 rises from the valve seat 17 (not shown in FIG. 2), with the result that fuel can flow out of the low-pressure line 5, through the gap that then exists between the valve element 16 and the valve seat 17, and through an annular flow duct 20 in the direction of the high-pressure pump 2.

The annular flow duct 20 is delimited on the outside by the housing 12 and on the inside by an inner part 23. The inner part 23 can be part of the housing 12 or can be a separate component which is connected to the housing 12.

The inner part 23 is of pot-shaped configuration with a "bottom" 24 and a substantially cylindrical "wall" 25. On its end facing the valve member 16, the inner part 23 has a damping chamber 26. In the damping chamber 26 there is a spring 30, which presses the valve element 16 against the valve seat 17.

The inner part 23 can be produced from plastic or metal, e.g. as a formed sheet metal part.

The plate-shaped valve element 16 projects at least partially into the inner part 23 and in this way delimits the damping chamber 26.

The damping chamber 26 is filled with fuel and is connected to the flow duct 20 via a constriction 27 acting as a restrictor.

A first projection 28 is formed in the wall 25 of the inner part 23 or of the damping chamber 26, forming a stop for a surface 29 of the valve element 16 facing away from a valve seat 17 in an open position of the valve element 16. The first projection 28 does not have to be of radially encircling configuration. It is sufficient for the support of the valve element 16 if the first projection 28 comprises two or more segments distributed over the periphery and arranged in the annular shielding section 25. One such segment with the reference sign 28 is illustrated in the lower part of FIG. 2, while there is no such segment in the upper part of FIG. 2.

The illustration in FIG. 2 shows the quantity control valve 10 in the closed position. In the closed position, the valve element 16 rests on the valve seat 17 of the housing 12. In an open position, the valve element 16 is supported against the first projection 28 of the annular shielding section 25.

The quantity control valve 10 operates as follows:

If the actuator 11 is deenergized, the spring force of the solenoid valve spring 13 moves the valve needle 14 and the magnet armature 15 securely connected thereto to the left in the drawing. During this process, the valve needle 14 strikes against the valve element 16 and moves it likewise to the left. As a result, the fuel in the fluid container 26 is put under pressure and must escape into the flow duct 20 through the constriction 27. This is indicated in FIG. 2 by an arrow (without a reference sign). In this process, the constriction 27 acts as a restrictor, with the result that the fuel can escape only slowly. The resulting hydraulic force has a damping effect counter to the spring force of the solenoid valve spring 13, with the result that the speed with which the valve element 16 strikes against the first projection 28 is reduced.

When the actuator 11 is energized, the valve needle 14 moves to the left in the drawing, with the result that the valve member 16 can move in the direction of the valve seat 17, like a conventional inlet valve.

As an alternative, the quantity control valve 10 can also be closed when deenergized.

Figure 3:
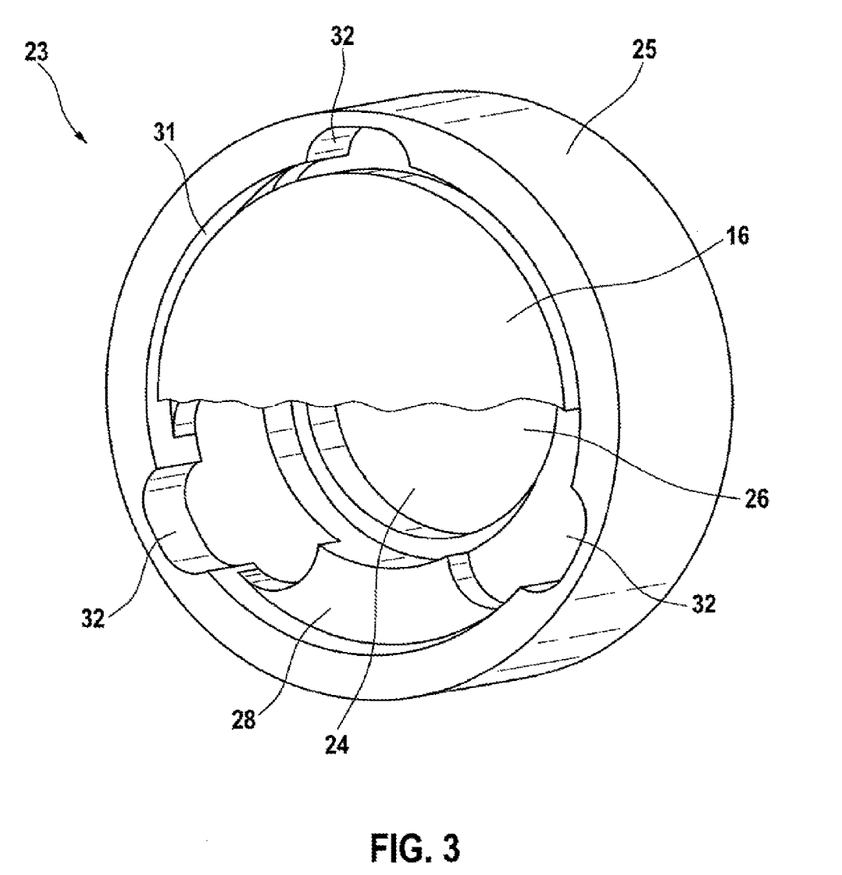
FIG. 3 shows a valve element and an inner part in a first embodiment.

FIG. 3 shows an isometric illustration of the inner part 23 as seen from the valve element 16. For clarity, the valve element 16 is shown sectioned. The constriction consists essentially of a plurality of recesses 32 distributed over the periphery of the gap 31. As an alternative, the recesses 32 can also be formed in the valve member 16. Overall, the annular area of the gap 31 and the cross-sectional areas of the recess 32 perpendicular to the center line 18 of the quantity control valve 10 form the effective flow cross section of the constriction 27. In this case, the recesses 32 are decisive for the damping behavior of the constriction 27 because a majority of the fuel displaced from the damping chamber 26 or flowing back into the damping chamber 26 flows through the recesses 32.

This also means that dimensional deviations due to manufacture in the diameters of the valve element 16 or the wall 25 have only a slight effect on the damping behavior of the damping chamber 26. As a result, the scatter between different examples of mass-produced quantity control valves 10 is greatly reduced, bringing considerable advantages in the operation of the internal combustion engine.

Figure 4:
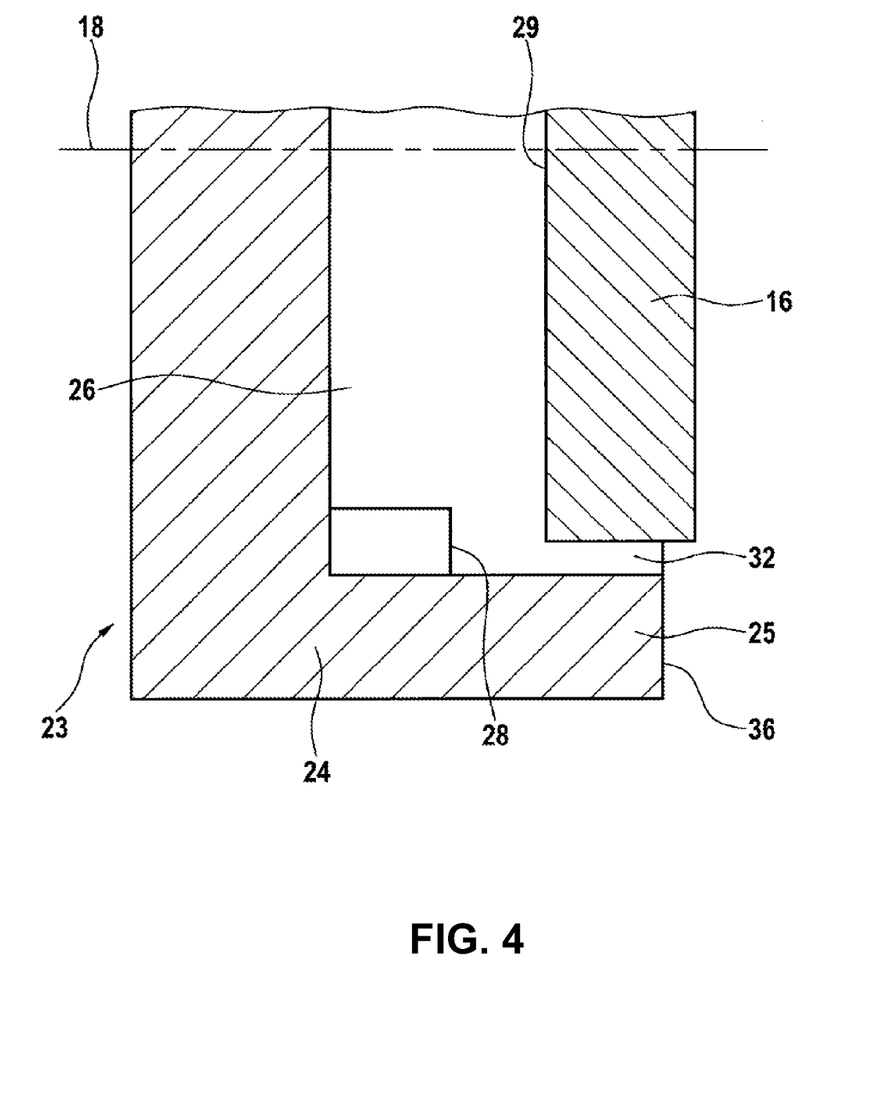
FIG. 4 shows a detail view of the valve element and of the inner part in a second embodiment.

In the first illustrative embodiment, which is illustrated in FIGS. 2 and 3, the extent of the recess 32 into the damping chamber 26 along the center line 18 is greater than that of the projection 28 serving as a stop for the valve element 16; however, it does not reach the bottom 24 of the inner part 23. FIG. 4 shows a variant in which the recess 32 reaches as far as the bottom 24.

Figure 5:
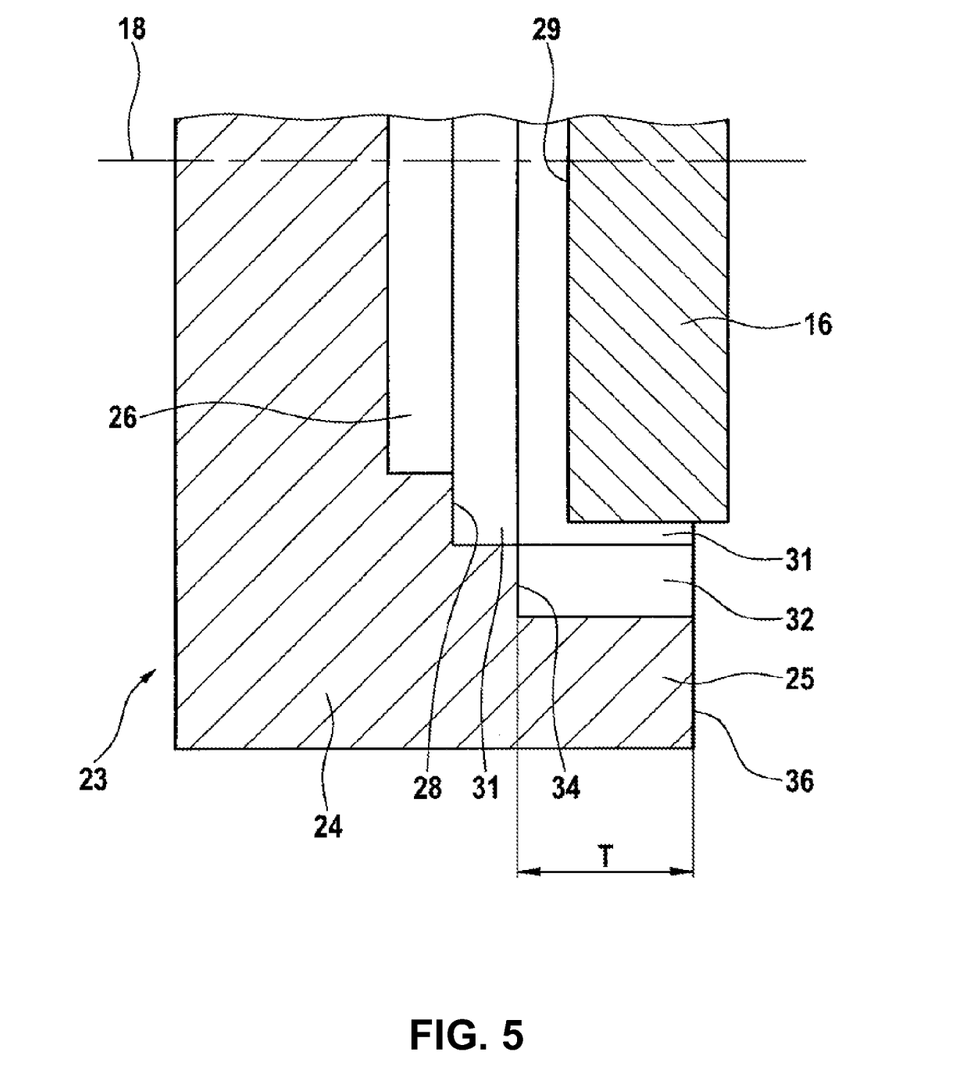
FIG. 5 shows a detail view of the valve element and of the inner part in a third embodiment.

FIG. 5 shows a variant in which the recess 32 ends ahead of the first projection 28. In the illustrative embodiment shown in FIG. 5, a depth T of the recess 32 is limited by a second projection 34. This ensures that the valve element 16 covers the effective flow cross section of the recess 32 before it strikes against the first projection 28. In this way, a large total flow cross section is available at the beginning of the opening movement of the valve element 16, said cross section being composed of the flow cross section of the gap 31 and the flow cross sections of the recesses 32. As a result, the fuel can escape quickly from the damping chamber 26, and the valve element 16 moves quickly in the direction of the first projection 28.

As soon as the valve element 16 has moved as far in the direction of the first shoulder 28 that it covers the recesses 32 with its (end) face 29 facing away from the resting seat 17, only the flow cross section of the gap 31 is then effective, with the result that the damping effect increases and the valve member 16 is retarded even further before it strikes against the first shoulder 28. As a consequence, the valve element 16 also moves more slowly in the direction of the first projection 28. As a result, the momentum of the valve element 16 upon impact with the first projection 28 is further reduced. As a consequence of this, the noise which arises during this process is also less. Thus, variable damping depending on the position of the valve member 16 is achieved. In this case, the damping characteristic that results therefrom has a step.

Figure 6:
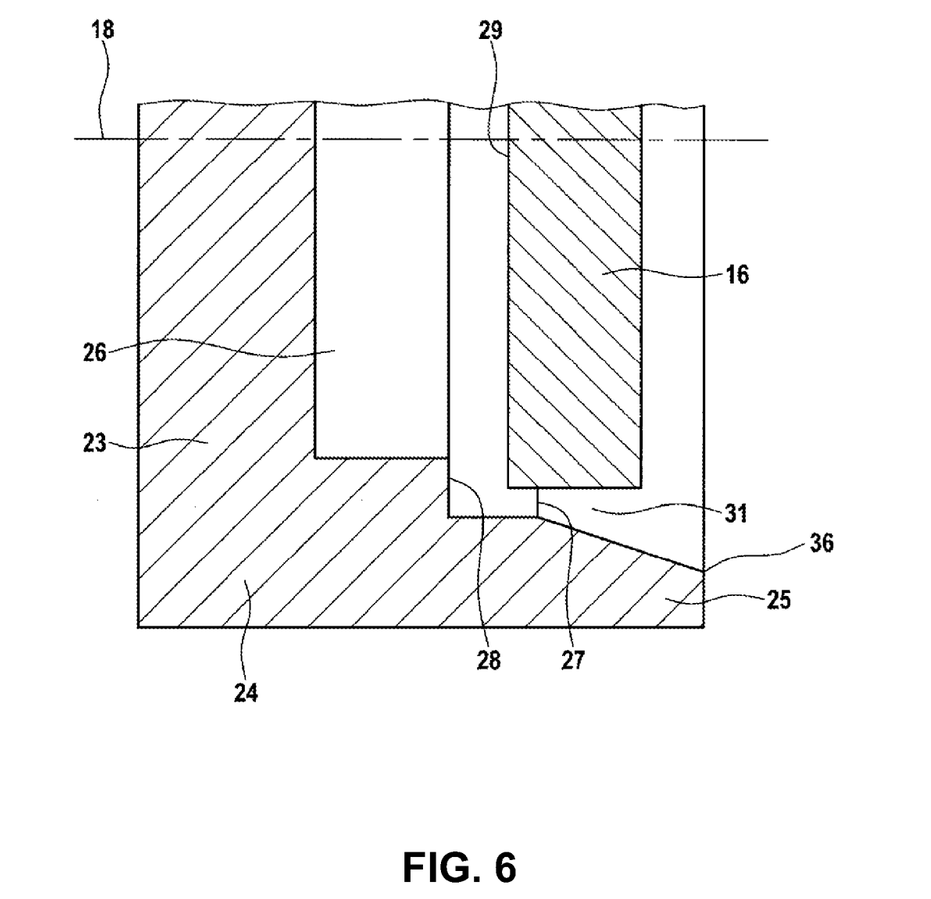
FIG. 6 shows a detail view of the valve element and of the inner part in a fourth embodiment.

FIG. 6 shows an embodiment of the disclosure similar to FIG. 5, wherein the recess 32 tapers from one edge 36 of the wall 25 toward the constriction 27. As a result, the gap 31 assumes the form of a frustocone in a first section extending from an edge 36 of the inner part 23 to the constriction 27. The edge 36 marks the start of the gap 31. A second section adjoining this, which extends from the constriction 27 to the first projection 28, is made cylindrical.

The fundamental operation of the embodiment illustrated in FIG. 6 is comparable to that in FIG. 5. However, the continuous decrease in the effective flow cross section in the constriction 27 means that the speed with which the valve element 16 moves into the open position thereof, i.e. in the direction of the first projection 28, likewise decreases continuously. Consequently, the valve element 16 is retarded in a uniform manner.

In all the embodiments illustrated by means of FIGS. 2 to 6, the recesses 32 are formed in the wall 25 of the inner part 23. Of course, the advantages according to the disclosure are also achieved if the recesses 32 are present in the valve member 16. A combination of recesses 32 in the wall 25 and in the valve member 16 is also possible.

The invention claimed is:

1. A quantity control valve, comprising:
    a housing including a valve seat;
    a valve needle arranged in the housing and configured to move in an axial direction;
    an inner part arranged within the housing, the inner part including a damping chamber delimited radially by a wall of the inner part;
    a flow duct arranged in the housing, the flow duct surrounding the inner part;
    a valve element arranged at least partially within the inner part and configured to at least partially delimit the damping chamber, the valve needle configured to contact a valve face of the valve element to move the valve element in an opening direction; and
    a gap defined radially between the wall of the inner part and the valve element, the gap including at least one recess,
    wherein the gap fluidically connects the damping chamber to the flow duct when the quantity control valve is in a closed position.

2. The quantity control valve as claimed in claim 1, wherein:

a periphery of the gap extends in a plane orthogonal to the axial direction of the valve needle; and the at least one recess extends over less than 50% of the periphery of the gap.

3. The quantity control valve as claimed in claim 1, wherein a flow cross section of the gap varies depending on a position of the valve element relative to the damping chamber.

4. The quantity control valve as claimed in claim 3, wherein a depth of the at least one recess is less than a depth of the gap.

5. The quantity control valve as claimed in claim 3, wherein a depth of the at least one recess is greater than a depth of the gap.

6. The quantity control valve as claimed in claim 3, wherein the at least one recess tapers from an edge of the wall of the damping chamber toward a bottom of the damping chamber.

7. The quantity control valve as claimed in claim 1, further comprising:
a first projection formed in the damping chamber,
wherein the first projection is an end stop of the valve element.

8. The quantity control valve as claimed in claim 7, wherein the first projection includes two or more segments distributed over a periphery of the gap.

9. The quantity control valve as claimed in claim 1, wherein the inner part is formed integrally within the housing.

10. The quantity control valve as claimed in claim 1, wherein the inner part is connected to the housing.

11. The quantity control valve as claimed in claim 1, wherein:
a periphery of the gap extends in a plane orthogonal to the axial direction of the valve needle; and
the at least one recess extends over less than 30% of the periphery of the gap.

12. A high-pressure pump, comprising:
a pump element and an inlet valve, wherein the inlet valve is a quantity control valve including:
a housing including a valve seat;
a valve needle arranged in the housing and configured to move in an axial direction;
an inner part arranged within the housing, the inner part including a damping chamber delimited radially by a wall of the inner part;
a flow duct arranged in the housing, the flow duct surrounding the inner part;
a valve element arranged at least partially within the inner part and configured to at least partially delimit the damping chamber, the valve needle configured to contact a valve face of the valve element to move the valve element in an opening direction; and
a gap defined radially between the wall of the inner part and the valve element, the gap having at least one recess,
wherein the gap fluidically connects the damping chamber to the flow duct when the inlet valve is in a closed position.

13. The high-pressure pump as claimed in claim 12, wherein the flow duct hydraulically connects a pump chamber of the high-pressure pump to a low-pressure line.

* * * * *